J. D. FLORY.
HITCH FOR TWO-WHEEL TRACTORS.
APPLICATION FILED FEB. 4, 1919. RENEWED JUNE 14, 1920.
1,350,962.
Patented Aug. 24, 1920.
2 SHEETS—SHEET 1.
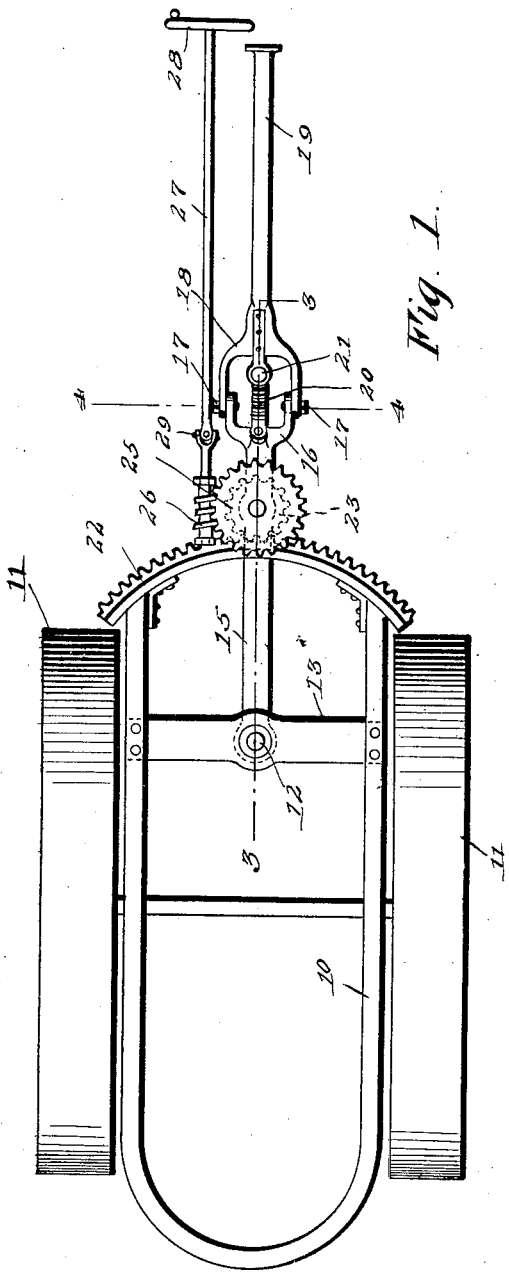
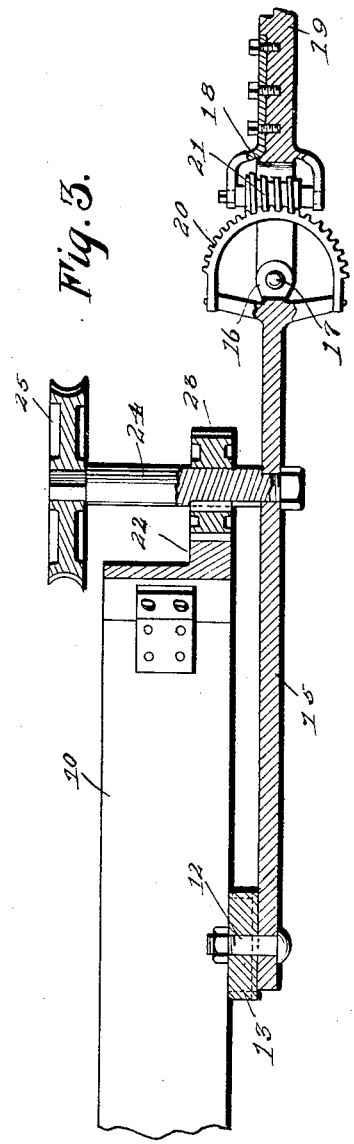
WITNESSES:
K. A. Thomas.
INVENTOR
J. D. Flory.
BY
Victor J. Evans
ATTORNEY J. D. FLORY.
HITCH FOR TWO-WHEEL TRACTORS.
APPLICATION FILED FEB. 4, 1919. RENEWED JUNE 14, 1920.
1,350,962.
Patented Aug. 24, 1920.
2 SHEETS—SHEET 2.
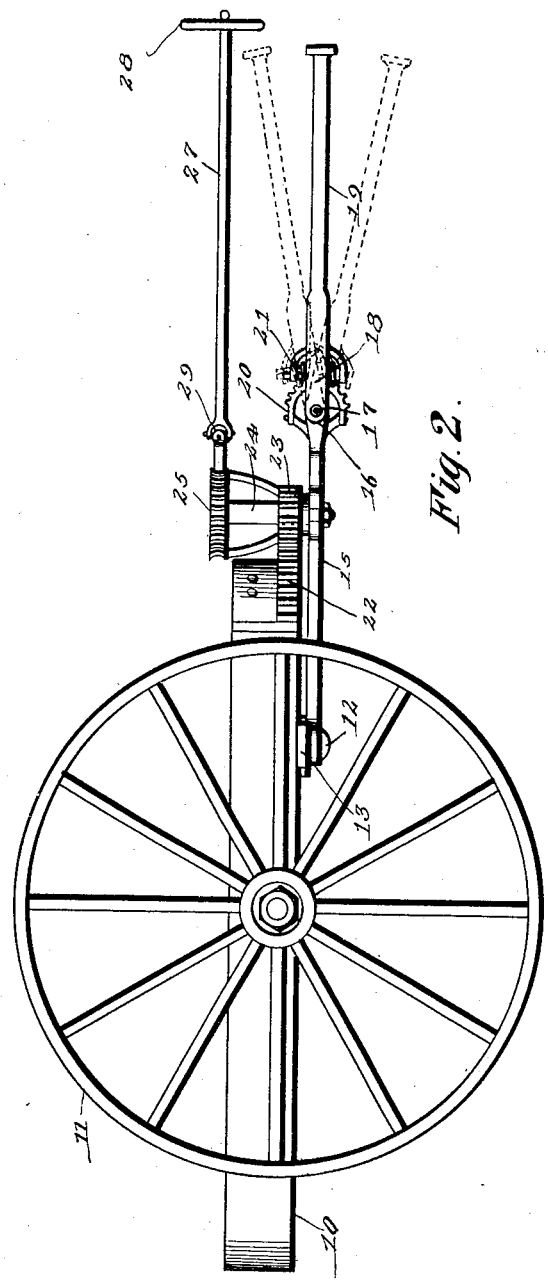
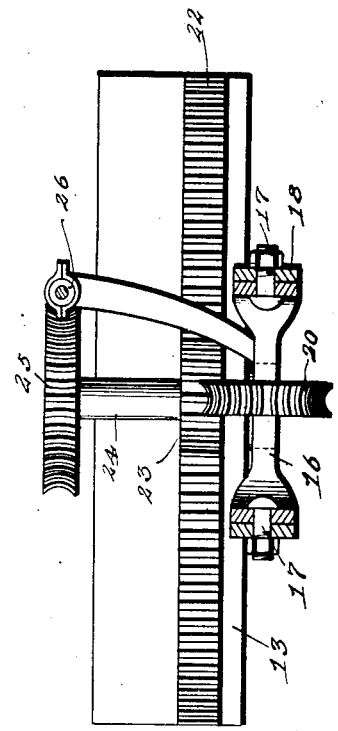
WITNESSES:
R. A. Thomas
INVENTOR
J. D. Flory
BY
Victor J. Evans
ATTORNEY

UNITED STATES PATENT OFFICE.

JESSE D. FLORY, OF CAMDEN, OHIO.

HITCH FOR TWO-WHEEL TRACTORS.

1,350,962.

Specification of Letters Patent. Patented Aug. 24, 1920.

Application filed February 4, 1919, Serial No. 274,903. Renewed June 14, 1920. Serial No. 389,265.

*To all whom it may concern:*

Be it known that I, JESSE D. FLORY, a citizen of the United States, residing at Camden, in the county of Preble and State of Ohio, have invented new and useful Improvements in Hitches for Two-Wheel Tractors, of which the following is a specification.

This invention relates to an improved means for connecting a two wheel tractor or vehicle, the object being to provide a hitch, which may be adjusted to the point of connection with the vehicle, while maintaining the proper horizontal position of the tractor.

It is also the purpose of the invention to provide in connection with the hitch, a steering mechanism which is especially applicable to a device of this character, permitting of the proper steering of the tractor irrespective of the relative height of the said tractor and the drawn vehicle.

To this end the invention includes a wheel supporting frame, to which is pivotally connected a combined steering and draft bar, the latter being in turn pivotally connected to a coupling bar, which may be detachably secured to a vehicle, the pivotal connection between the combined steering and draft bar and the coupling bar being such as to maintain the said bars in position after adjustment. The invention further includes means for steering the tractor which may be operated from the vehicle to which the said tractor is connected irrespective of the relative height of the tractor or the said vehicle.

The invention also includes the following novel details of construction, combination and arrangement of parts to be hereinafter more fully described and illustrated in the accompanying drawings:

In the drawings:

Figure 1 is a plan view of a two wheel tractor equipped with the hitch and steering mechanism embodying the present invention.

Fig. 2 is a side elevation of the same.

Fig. 3 is an enlarged sectional view on the line 3—3 of Fig. 1 and

Fig. 4 is a similar view on the line 4—4 of Fig. 1.

Referring in detail to the drawings, like characters of reference denote corresponding parts throughout the several views.

The invention is illustrated as applied to a tractor of the two wheeled type, the frame of the tractor being shown at 10 and the wheels 11. The frame 10 is designed to support a suitable motor (not shown), of any improved type.

Pivotally connected as shown at 12 to a cross bar 13 secured to the frame 10 is a combined steering and draft arm 15, that terminates at its inner end in a yoke 16. This yoke is pivotally connected as shown at 17, to a similar yoke 18 formed upon one end of a coupling bar 19, the latter being supplied with suitable means for connection with a vehicle.

Rigidly mounted upon the end of the combined steering and draft bar 15, between the ends of the yoke 16 is a worm gear, in the form of a segment 20. This segment is engaged with a worm 21 which is mounted for rotation within the yoke 18 of the coupling bar 19. Any suitable means may be employed for rotating the worm 21 so as to properly adjust and hold the tractor in a substantially horizontally position, irrespective of the relative height of the said tractor and vehicle.

In order to provide the proper steering mechanism for the tractor, which will be adjusted to the coupling means, the frame 10 is provided with a segmental steering rack 22, which is in mesh with a gear 23, mounted upon a shaft 24 carried by the combined steering and draft bar 15. The shaft 24 is also provided with a worm gear 25 which is rotated through the medium of a worm 26 mounted upon the end of the steering rod 27. The steering rod is provided with a suitable hand wheel 28 and with a universal joint 29 so as to permit of the adjustment of the steering wheel for the different elevations of the drawn vehicle.

The invention is susceptible of various changes in its form, proportion and minor details of construction and the right is herein reserved to make such changes as properly fall within the scope of the appended claims.

I claim:—

1. The combination with a two wheeled tractor, of a coupling bar, a vertically disposed worm mounted for rotation at one end of said bar, a gear rigidly mounted upon the tractor for engagement with the worm and means for pivotally connecting the coupling bar and tractor, whereby the worm and gear will control the vertical position of the opposite end of the coupling bar with respect to the forward portion of said tractor.

2. The combination with a two wheeled tractor, of a coupling bar, a vertically disposed worm mounted for rotation at one end of said bar, a gear rigidly mounted upon the tractor for engagement with the worm, a yoke located in the end of the coupling bar, a yoke extending from the tractor and means for pivotally connecting the arms of the yokes concentrically with the gear for raising and lowering the opposite end of the coupling bar with respect to the forward portion of said tractor.

3. A two wheel tractor comprising a wheel supported frame, a combined steering and draft bar pivotally secured thereto, a coupling bar pivotally secured to the combined steering and draft bar and means located at the pivoted end of the coupling bar for controlling the vertical position of the free end of said bar with respect to the forward portion of said tractor.

In testimony whereof I affix my signature.

JESSE D. FLORY.